United States Patent
Matthews et al.

(10) Patent No.: US 8,550,033 B2
(45) Date of Patent: Oct. 8, 2013

(54) METHOD OF ESTABLISHING CLAM BED COLONIES AND MOBILE FLOATING HATCHERY FOR IMPLEMENTING SAME

(76) Inventors: Paul C. Matthews, Mattituck, NY (US); John G. Bradley, Mattituck, NY (US)

( * ) Notice: Subject to any disclaimer, the term of this patent is extended or adjusted under 35 U.S.C. 154(b) by 935 days.

(21) Appl. No.: 11/054,638

(22) Filed: Feb. 8, 2005

(65) Prior Publication Data
US 2005/0145189 A1    Jul. 7, 2005

Related U.S. Application Data

(63) Continuation of application No. 10/358,092, filed on Feb. 4, 2003, now abandoned.

(60) Provisional application No. 60/354,334, filed on Feb. 5, 2002.

(51) Int. Cl.
*A01K 61/00*    (2006.01)

(52) U.S. Cl.
USPC .......................................... 119/236; 119/238

(58) Field of Classification Search
USPC ................. 119/207, 208, 223, 224, 234, 236, 119/238
See application file for complete search history.

(56) References Cited

U.S. PATENT DOCUMENTS

| | | | | |
|---|---|---|---|---|
| 3,601,094 A * | 8/1971 | Kittaka | ........................ | 119/205 |
| 3,916,832 A * | 11/1975 | Sweeney | ........................ | 119/212 |
| 3,996,895 A * | 12/1976 | Wiegardt, Jr. | ........................ | 119/237 |
| 3,998,186 A * | 12/1976 | Hodges | ........................ | 119/207 |
| 4,061,110 A * | 12/1977 | Steidle | ........................ | 119/241 |
| 4,279,218 A * | 7/1981 | Brinkworth | ........................ | 119/200 |
| 4,285,298 A * | 8/1981 | Dugan et al. | ........................ | 119/207 |
| 4,675,110 A * | 6/1987 | Fay | ........................ | 210/436 |
| 4,711,199 A * | 12/1987 | Nyman | ........................ | 119/223 |
| 4,876,985 A * | 10/1989 | Marcum et al. | ........................ | 119/240 |
| 5,009,189 A * | 4/1991 | Neff | ........................ | 119/200 |
| 5,186,121 A * | 2/1993 | Smith, Jr. | ........................ | 119/243 |
| 5,269,254 A * | 12/1993 | Gagliano et al. | ........................ | 119/237 |
| 6,223,689 B1 * | 5/2001 | Nelson | ........................ | 119/234 |
| 2003/0094141 A1 * | 5/2003 | Davis | ........................ | 119/234 |

OTHER PUBLICATIONS

"Veliger Stages" [online], Aug. 18, 2004 [retrieved Mar. 3, 2006]. Retrieved from the internet: <URL:http://el.erdc.usace.army.mil/zebra/zmis/zmishelp4/veliger_stages.htm>.*

* cited by examiner

*Primary Examiner* — David Parsley
(74) *Attorney, Agent, or Firm* — Hoffmann & Baron, LLP

(57) ABSTRACT

A method for establishing a clam bed includes raising clam larvae in a captive environment in which they are provided with adequate food and habitat requirements, and kept isolated from predation by natural predators. The clam larvae are maintained in this environment during the first larval stage, referred to as the trochophore stage of development, when the larvae are particularly vulnerable to mortality. During the next stage of development, the developing larval clams are released, preferably in large numbers (saturation spawning) at any time during the veliger stage of development, i.e., the generic stage following the trochophore larval stage, and which includes the sub-stages of straight-hinge veliger, umbonate veliger, and pediveliger. Preferably, the entire process prior to release in accordance with the invention is carried out in a closed system, to significantly reduce possible exposure to contaminants and/or harmful predator larvae/parasites, in addition to larger animal predators.

15 Claims, 1 Drawing Sheet

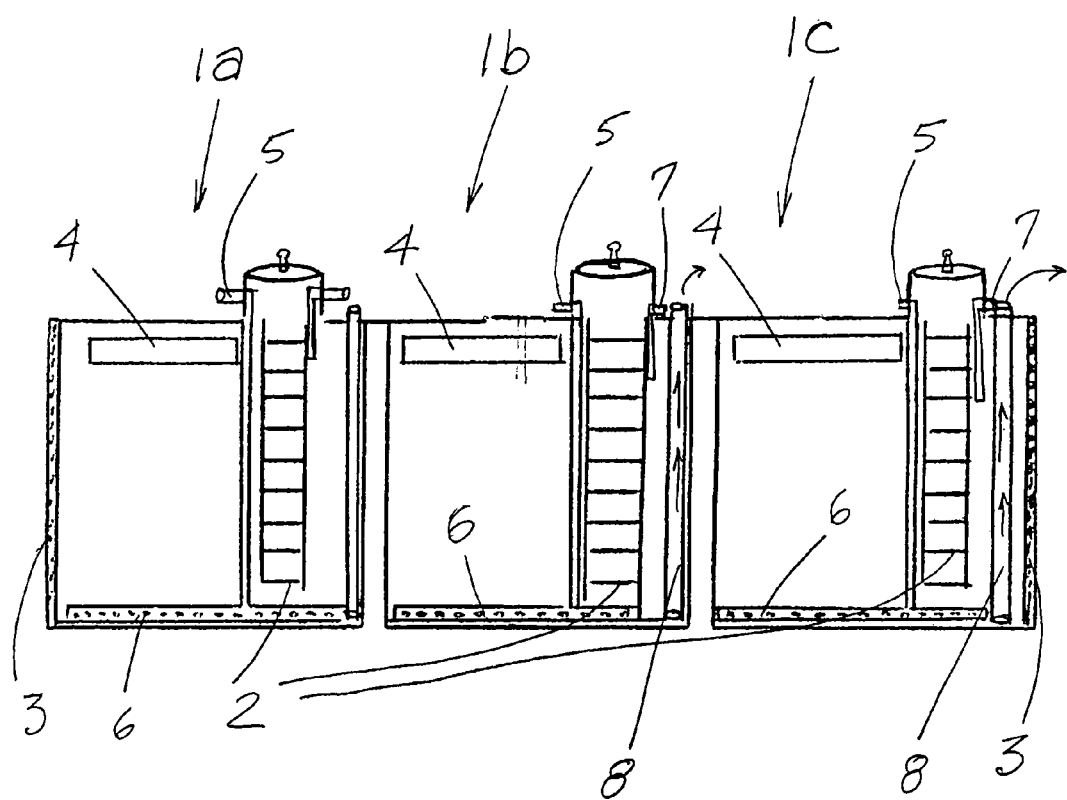

METHOD OF ESTABLISHING CLAM BED COLONIES AND MOBILE FLOATING HATCHERY FOR IMPLEMENTING SAME

CROSS REFERENCE TO RELATED APPLICATIONS

This application is a continuation of application Ser. No. 10/358,092, filed Feb. 4, 2003 now abandoned entitled METHOD OF ESTABLISHING CLAM BED COLONIES AND MOBILE FLOATING HATCHERY FOR IMPLEMENTING SAME, which in turn claims the benefit of U.S. Provisional Application No. 60/354,334 filed Feb. 5, 2002 entitled MOBILE FLOATING HATCHERY AND METHOD OF SPAWNING FISH USING SAME.

BACKGROUND OF THE INVENTION

The present invention relates to a method of establishing clam bed colonies by a captive-reared clam releasing program, and mobile floating hatchery for facilitating the implementation of the method and which is usable, as well, for spawning other aquatic species of shellfish and finfish.

Attempts over the last 20 years to increase the population of clams have not heretofore proved to yield impressive results. For example, there are significantly reduced numbers of clams (specie *Mercenaria mercenaria*) remaining harvestable in the bays and harbors of Long Island, N.Y., and no doubt other such similar beds around the world are greatly depleted.

In accordance with the current state of the art, the clam sperm, egg & subsequent larvae are handled in a clinical laboratory setting, yielding less that satisfying results. Microscreening techniques are employed in the laboratory, and the larvae are filtered 3 or 4 times before their next stage of development following the larval state.

In the lab, scientists have been guilty not only of exposing the clam larvae to torturous unnatural screenings (exposed to air and UV light), but also of depriving the clams a sandy bottom for them to "set" in. "Setting" is the term used to describe the process implemented by the clam in a natural environment when adapting to the sea or bay bottom. For this reason, the lab-generated clams have not been exposed to the natural conditions existing in the bays during their early development, and therefore, do not acclimate to the natural environment as would naturally occurring juvenile clams. When they are finally released, they have been observed to sit atop of the sand bed, and are therefore easy prey to their natural enemies because they do not possess or exhibit the behavioral traits necessary for survival.

Sometimes, in accordance with conventional practice, scientists even use epinephrine (Adrenaline) to stimulate the clams into setting. But the fact remains, that such scientific endeavors have failed to provide an adequate method of repopulating clam beds.

In addition to land-based hatcheries which produce clams in captivity as outlined above, floating hatcheries are also presently known in the art, and which are generally moored in a fixed position. As such, they are not provided with propellers or other form of mobility. Moreover, they are generally operated as an open system, allowing seawater to enter the holding areas in which the clams are located, in order to provide food in the form of algae and plankton for the growing clams. Such system may expose the clams to predator organisms, parasitic attack and/or other contamination.

In accordance with the above described hatchery procedures (both laboratory, i.e., land-based, and floating) the clams are raised until they can be sold as "seed," at which time they are generally about the size of a pinky nail. At this advanced size, as mentioned above, they do not exhibit an effective degree of burrowing when released.

Accordingly, it is an object of the invention to provide a clam spawning and seeding program which overcomes the drawbacks of the prior art.

It is a further object of the invention to a floating hatchery which promotes such spawning and a seeding program and which is useful for spawning other shellfish and finfish.

SUMMARY OF THE INVENTION

In accordance with these and other objects of the invention, there is provided a method of establishing clam beds in accordance with which clam larvae are raised in a protected environment in which they are provided with adequate food and habitat requirements, and kept isolated from predation by natural predators. The clam larvae are maintained in this environment during the first larval stage, referred to as the trochophore stage of development, when the larvae are particularly vulnerable to mortality. During the next stage of development, which, depending on water temperature, is believed to occur between about 7 to 14 days after fertilization (formation of zygotes) the larva is called a veliger, because it has a velum (Latin: "curtain"), a sail-shaped organ that extends from the miniature larval shell which is forming. This structure helps, among other things, to enable the clam to be mobile in the water. At this point ("buoyancy" stage), the clams start to spin (visible microscopically). Later in the veliger stage (pediveliger), they develop their foot, which enables them to attach to a grain of sand in their natural habitat, and begin their cycle of burial in sand and algae water filtering. In accordance with the method herein, the developing larval clams are released in large number at any time during the veliger stage of development, which includes the stages of straight-hinge veliger, umbonate veliger, and pediveliger. Preferably, the entire process prior to release in accordance with the invention is carried out in a closed system, to significantly reduce possible exposure to contaminants and/or harmful predator larvae/parasites, in addition to larger animal predators.

To facilitate implementation of the above method, which requires release of veliger stage clams in large numbers (referred to herein as "saturation spawning"), the invention extends to a mobile hatchery/nursery which can be used to breed and/or rear the clam larvae, and conveniently and effectively release the veliger larvae at a site selected for seeding of the prospective clam bed. The mobile floating hatchery (or more accurately "nursery" in the case where the clam larvae are obtained from a breeding facility, rather than being produced aboard vessel) conveniently utilizes tanker ships, barges or the like of basic design known in the art, containing several separate large volume tanks. To adapt such vessels to function as a mobile hatchery/nursery serving to facilitate practice of the disclosed method, the tanks are lined with suitable non-toxic coatings so that the clam larvae will not be adversely affected during the beginnings of life on board the tankers. The mobile hatchery/nursery is moved to a desired location, and the veliger larvae pumped into the waters over the site of the prospective clam bed to be repopulated.

The above, and other objects, features and advantages of the present invention will become apparent from the following description read in conjunction with the accompanying drawings.

BRIEF DESCRIPTION OF THE DRAWINGS

FIG. 1 is a schematic view of three tanks of the type suitable for use aboard a vessel adapted to service as a mobile floating fish hatchery/nursery in accordance with an embodiment of the invention.

DETAILED DESCRIPTION OF THE PREFERRED EMBODIMENT

A method is described for establishing a clam bed at a desired location in bays and other suitable aquatic locations. In accordance with the method, clam larvae are raised in a protected environment in which they are provided with adequate food and habitat requirements, and kept isolated from predation by natural predators. The clam larvae are maintained in this environment throughout the first larval stage, referred to as the trochophore stage of development, when the larvae are particularly vulnerable to mortality. During the next stage of development, which, depending on water temperature, is believed to occur between about 7 to 14 days after fertilization (formation of zygotes) the larva is called a veliger, because it has a velum (Latin: "curtain"), a sail-shaped organ that extends from the miniature larval shell which is forming. This structure helps, among other things, to enable the clam to be mobile in the water. At this point (i.e., the veliger stage, referred to alternatively herein generally as the "buoyancy" stage), the clams start to spin (visible microscopically). Later in the veliger stage (pediveliger), they develop their foot, which enables them to attach to a grain of sand in their natural habitat, and begin their cycle of burial in sand and algae water filtering. In accordance with the method herein, the developing larval clams are to be released in large number (referred herein as "saturation spawning/release") at any time during the veliger stage of development, i.e., the generic stage following the trochophore larval stage and which includes the sub-stages of straight-hinge veliger, umbonate veliger, and pediveliger. Preferably, the entire process prior to release in accordance with the invention is carried out in a closed system, to significantly reduce possible exposure to contaminants and/or harmful predator larvae/parasites, in addition to larger animal predators. In this regard, suitable conventional means for filtering and/or sterilizing the water (UV, etc.) in which the clam larvae are raised are advantageously employed to reduce risk to the larvae. It will be apparent to one of ordinary skill in the art what steps should be taken to avoid harmful exposure of the larvae balanced against economic considerations associated therewith, and therefore further discussion of the exact conditions to be observed are omitted as unnecessary. Furthermore, since the factors and conditions contributing to successful development of clam larvae in captivity are well known in the art as practiced in existing hatcheries, such details relating, for example, to nutrient supplementation, temperature, salt concentration, filtration techniques, light requirements, etc., are similarly omitted herein.

To facilitate the implementation of the above-disclosed method of establishing clam bed colonies, an embodiment in accordance with the invention is directed to a mobile hatchery/nursery which can be used to breed and/or rear the clam larvae prior to release, and conveniently and effectively to release the veliger larvae at a site selected for seeding of the prospective clam bed.

Referring now to FIG. 1, a mobile floating hatchery (or more accurately "nursery" in the case where the clam larvae are obtained from a breeding facility, and further raised, rather than actually being produced, aboard vessel), conveniently utilizes tanker ships of basic design known in the art (and therefore not depicted), containing several separate large volume tanks, as shown in FIG. 1, and respectfully designated 1a, 1b and 1c. To adapt such vessels to function as a mobile hatchery/nursery serving to facilitate practice of the disclosed method, the tanks 1a, 1b and 1c are lined with suitable non-toxic coatings so that the clam larvae will not be adversely affected during the beginnings of life on board the tankers. Such suitable coatings include, for example, marine paint having inert properties after curing, plastic or natural resins, etc. . . . Applicants are using, in practice, six tanks, three on each side of the vessel, (only three being shown in the illustrated embodiment), each with a 4,000 gallon capacity. Even using half that volume, the number of spawned larvae is believed to be capable of reaching approximately 200 million individuals for each tank. The tanks include a ladder 2 descending to a bottom thereof, and are advantageously insulated with foam 3 for better temperature regulation, as needed.

Although many suitable ways of rearing the young clam larvae of various species prior to release will be found acceptable in accordance with furtherance of the objectives of the invention and within the contemplated scope thereof, the following represents one working example directed to the hard clam found along the eastern coast of North America (*Mercenaria mercenaria*). Tank 1a will be filled to capacity with 4,000 gallons of filtered green water. Tanks 1b and 1c, both also 4,000 gallon capacity, are filled with 200 gallons of algae-rich green water to which fertilized shellfish eggs are added. Light, compressed air and 71° F. temperature are advantageously maintained to promote algae growth. Light fixtures 4 and an air intake 5 for introducing the compressed air are provided, the air intake 5 being communicative with a perforated air release tube 6 located at a bottom of each tank 1a, 1b, 1c. Water from tank 1a will be transferred to drip tanks (not shown) where it will be allowed to flow into tanks 1b, 1c at a rate of 10 gallons per hour per tank. When the shellfish larvae reach the release stage (veliger larvae), the mobile hatchery/nursery is moved to a desired location, and the veliger larvae pumped into the waters over the site of the prospective clam bed to be repopulated by pressurizing tanks 1b, 1c with introduction of pressurized air through pressure intakes 7, which in turn causes water and larvae to be expelled up through lift tubes 8 (conveniently 8"diameter) in the direction of the arrows, into the waters upon which the vessel is floating. It is noted that any other suitable means for transferring the larvae to their wild water environment, such as for example, a ventura type of pumping system of conventional design, can be used so as not to damage them in the process.

As noted above, the clam larvae are to be released after completion of the initial larval stage (trochophore). The subsequent stage (veliger) can be determined by microscopic examination of a sample of the water in tanks 1b, 1c. When the stage is reached, the larvae start spinning under the microscope, and it is then time to release them into the same environment from which their parents were taken (i.e., any time during veliger stage, including the sub-stages of straight-hinge veliger, umbonate veliger, and pediveliger, the earliest of which is believed to occur 7-14 days after fertilization) in large numbers. This "saturation" process in which millions of larvae are released at once in a chosen area according to the invention, is advantageously practiced during autumn when the presence of predators is low, i.e., September, October and November in the northern hemisphere, although other times of the years may be found to also be effective and contemplated within the intended scope of the invention. This completes the natural cycle within the confines of the mobile hatchery/nursery unit.

The above described embodiment is directed to rearing of already fertilized eggs or developing larvae from a hatchery, which are then transferred to the tanks aboard the vessel serving as the mobile nursery. However, the vessel can additionally serve as a hatchery as well as nursery, as outlined below.

In one or more of the tanks 1a, 1b, 1c, algae rich water is stored and propagated as a fresh food supply for the clam larvae. Once another of the tanks is advantageously partially filled with this algae rich water, for example halfway, healthy spawnable male and female clams (species *Mercenaria mercenaria*) are selected from local waters, and added to this tank, in advantageously equal numbers. At least 50% of the clams should be of "top neck" size to control and encourage a 50/50 sex mixture. If uneven, it is believed that more females (larger size than male) is preferable to more males. Advantageously, the brood stock is prepared for spawning for between 2 to 4 weeks, at which time they are environmentally conditioned by exposure to elements which includes one or more of the following. Two elements are temperature and light, which are regulated at optimum levels conducive to spawning. Food is provided dependent on the specie being propagated, and includes an algae/water mix for clams and crustaceans. Salinity is also monitored and maintained at ideal levels, for example, between about 22 and 27 ppt. The above described environmental conditioning can be performed on or off the vessel. The latter has been found to be more convenient.

The entire spawning and rearing process prior to release in accordance with the invention is advantageously carried out in a closed system, to significantly reduce possible exposure to contaminants and/or harmful predator larvae/parasites. Appropriate food sources are therefore prepared in a sheltered environment to achieve such end. Where algae is to be the food source (mollusks, clams, crustaceans, etc.), relatively pure planktonic micro algae is obtained, stored and propagated with U.V. light at proper temperatures. Water may be advantageously obtained by filtering available bay/sea water and pumping it into one or more storage tanks aboard the vessel of the type described above, with the intention of excluding chemical contaminants, predator larvae and/or parasites. The density of the culture obtained is advantageously $2 \times 10^5$ cell/ml. This culture is maintained at controlled light and temperature.

The spawning process will now be described. Spawning is induced by raising the temperature after advantageously scrubbing each clam, especially near the new growth area. The entire brood is spread flat in a filtered water-filled tank and placed under optimum conditions with the tank for about 10-24 days. Approximately 100 of each sex is believed to be sufficient to carry out the invention. It is noted that 1 clam of each sex can produce 5-20 million young in gametogenesis (combining of sperm and egg), although less males than females is believed to also be acceptable in carrying out the invention.

These male and female clams will be placed in a sanitized onion bag within the partially filled tank of algae rich water aboard the vessel. In order to induce spawning, the temperature of the water within the tanks is raised until such time as spawning occurs. Following spawning, the mature clams are removed. Sand is optionally added to form a layer at the bottom of the tank to encourage development of setting behavior prior to release Once the larvae appear, they are monitored closely. More algae rich water is be added, as needed to provide the expanding population of larvae with adequate food and habitat requirement. Aeration is also advantageously provided in order to inhibit hypoxia.

During this critical time of extreme vulnerability (trochophore larval stage), the most important factor for their survival is that the clam larvae be kept isolated aboard the tanks 1a, 1b, 1c of the vessel and are therefore invulnerable to any natural animal predators. Such isolation from predators allows for the survival and propagation of the species *Mercenaria mercenaria* which are present in the hundreds of millions per each batch.

In addition, in lieu of separation and filtering of the larvae using conventional screening techniques, in accordance with the present invention, the developing clam larvae are advantageously centrifuged occasionally. This is believed to mimic natural tidal action and may function to stimulate development of natural instincts, possibly important to the clams' later survival.

Where permitted by local law, the bay bottom will be advantageously slightly agitated with one or two raking type of systems prior to release of the veliger larvae, scouring the bottom so that sand grains will be readily available to the clams for immediate setting when they are released.

Although the above mobile floating hatchery and saturation spawning process is described herein with specific regard to *Mercenaria mercenaria* (hard clams), it is intended to additionally apply to all types of marine species, i.e., mollusks, crustaceans and finfish. Although each process is slightly different dependent upon species and habitat, the disclosure made herein, and directed to the specific example of clam propagation, provides adequate guidance to practice of the invention relative other species by one skilled in the art without undue experimentation. In such regard, giant tankers donated, for example, by environmentally conscious oil companies to a not-for-profit organization established to carry out the disclosed method of spawning aboard a natant vessel, could spawn other species, like finfish and crustaceans, in order to boost the ocean populations of these diminishing forms of life and food.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of establishing a clam bed, comprising:
   raising clam larvae through a trochophore stage of development in a captive environment; and
   releasing the clam larvae into waters above an area selected to contain the clam bed during a veliger stage of development following the trochophore stage.

2. A method according to claim 1, further comprising:
   providing a floating vessel on which at least a portion of said step of raising is conducted.

3. A method according to claim 2, further comprising:
   locating the floating vessel to a region proximate said area selected to contain the clam bed.

4. A method according to claim 1, wherein an entire process prior to said step of releasing is carried out in a closed system.

5. A method according to claim 1, wherein said veliger stage includes sub-stages of straight-hinge veliger, umbonate veliger, and pediveliger.

6. A method according to claim 1, further comprising occasionally centrifuging developing clam larvae during said raising.

7. A method according to claim 1, further comprising agitating a bottom substrate prior to said releasing, so that sand grains will be readily available to the clam larvae for setting when said clam larvae are released.

8. A method according to claim 1, wherein said clam larvae are of the genus Mercenaria.

9. A method according to claim 1, wherein said releasing is carried out during autumn in the northern hemisphere.

10. A method according to claim 1, wherein said larvae are protected from exposure to at least one of contaminants, harmful predator larvae, parasites or larger animal predators while in said captive environment.

11. A method of establishing a clam bed, comprising:
raising clam larvae through a trochophore stage of development in a captive environment; and
releasing the clam larvae, during a veliger stage of development following the trochophore stage, into a natural body of water above a naturally occurring bottom substrate into which the clam larvae may burrow to form said clam bed.

12. A method according to claim 11, wherein said veliger stage includes sub-stages of straight-hinge veliger, umbonate veliger, and pediveliger.

13. A method according to claim 11, wherein said clam larvae are of the genus Mercenaria.

14. A method according to claim 11, further comprising agitating said bottom substrate prior to said releasing, such that sand grains will be readily available to said claim larvae for setting when said clam larvae are released.

15. A method according to claim 11, wherein said captive environment is a closed system isolated from said natural body of water.

* * * * *